W. H. WINKS.
ENGINE STARTING DEVICE.
APPLICATION FILED JULY 15, 1912.
1,106,268.
Patented Aug. 4, 1914.
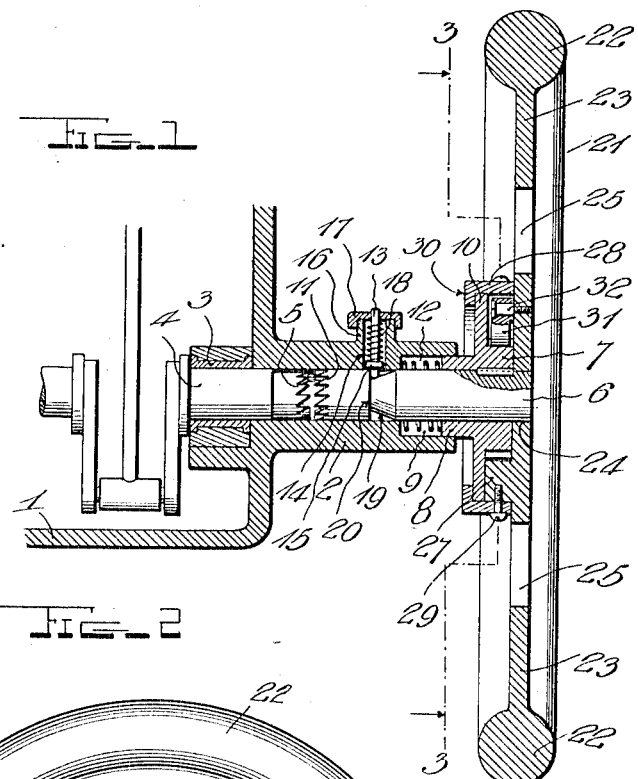
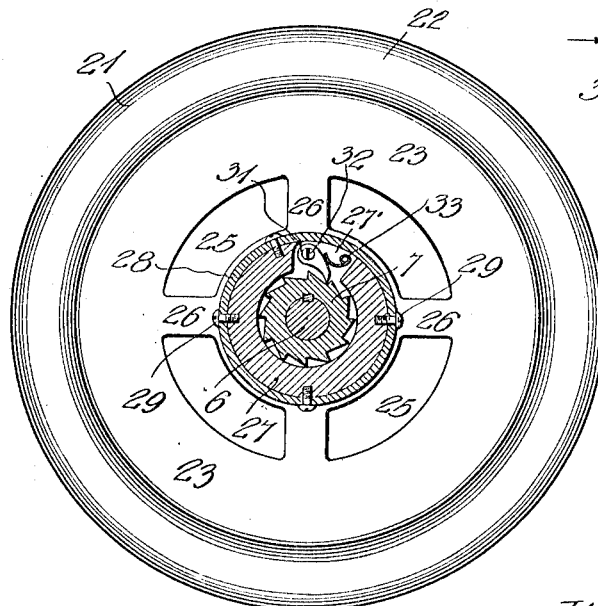
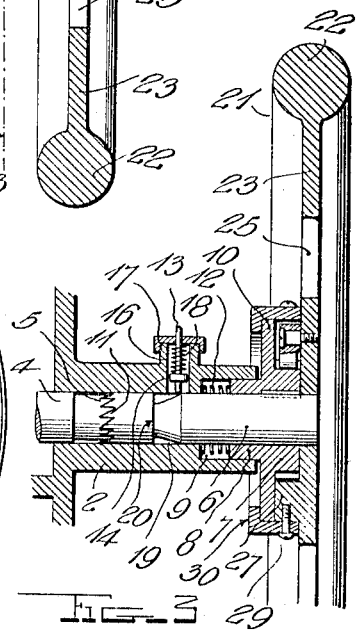
Witnesses
Inventor
Walter H. Winks
By H. R. Willson & Co.
Attorneys

UNITED STATES PATENT OFFICE.

WALTER H. WINKS, OF BALTIMORE, MARYLAND.

ENGINE-STARTING DEVICE.

1,106,268.  Specification of Letters Patent.  Patented Aug. 4, 1914.

Application filed July 15, 1912. Serial No. 709,566.

*To all whom it may concern:*

Be it known that I, WALTER H. WINKS, a citizen of the United States, residing at Baltimore, State of Maryland, have invented certain new and useful Improvements in Engine-Starting Devices; and I do declare the following to be a full, clear, and exact description of the invention, such as will enable others skilled in the art to which it appertains to make and use the same.

This invention relates to improvements in engine starting devices and particularly to starting devices for automobile engines.

One object of the invention is to provide an engine starter having an improved construction and arrangement of cranking wheel whereby should the engine back-fire the operator will not be injured by the reverse movement of the cranking mechanism.

Another object is to provide an improved means for connecting the cranking wheel with the engine shaft whereby when the wheel is turned in one direction the shaft will be turned and when the wheel is turned in the opposite direction the same will run loose on the shaft.

With these and other objects in view the invention consists of certain novel features of construction, and the combination and arrangement of parts as will be more fully described and claimed.

In the accompanying drawings; Figure 1 is a vertical longitudinal section through the forward end of the crank case of an engine and through a portion of my improved cranking mechanism showing the same in position to be connected with the end of the crank shaft; Fig. 2 is a cross sectional view thereof taken on the line 3—3 of Fig. 1; Fig. 3 is a view similar to Fig. 1 showing the cranking mechanism engaged with the end of the crank shaft.

Referring more particularly to the drawing 1 denotes a portion of the crank case of an explosive engine and 2 denotes the crank shaft bearing therein. The bearing 2 is extended or projects a considerable distance beyond the crank casing to receive and revolubly support the shaft of the cranking mechanism hereinafter described. Revolubly mounted in the inner portion of the bearing 2 and in a supplemental bearing 3 on the inner side of the crank casing is the forward end of the crank shaft 4 of the engine, said shaft having its outer end slightly reduced and provided with ratchet teeth 5 which form one member of the clutch connection between the crank shaft and the shaft of the cranking mechanism.

My improved cranking mechanism comprises a short shaft 6 which is revolubly mounted in the outer portion of the bearing 2 and has keyed thereto a ratchet gear 7 on the inner end of which is a cylindrical bearing sleeve 8 which is slidably and revolubly mounted in an annular recess of socket 9 formed in the outer end of the bearing 2. The gear 7 is also provided with an annular radially projecting flange 10 the purpose of which will be hereinafter described. On the inner end of the shaft 6 is an annular series of ratchet teeth 11 which form the other member of the clutch connection between the cranking shaft 6 and the crank shaft 4 of the engine and which co-act with the teeth 5 forming the clutch member of the crank shaft.

In the inner end of the socket 9 between the inner end of the sleeve 8 and the end of the socket is arranged a coiled spring 12 the pressure of which is exerted to disengage and to normally hold the clutch member 11 of the cranking shaft out of engagement with the clutch member 5 of the crank shaft. The outward movement of the cranking shaft 6 by the spring 12 is limited by a spring projected detent comprising a pin 13 which is slidably mounted in a transverse passage 14 formed in one side of the bearing 2 and which is provided with a combined stop and centering disk 15 arranged thereon near its inner end as shown. On the outer side of the bearing 2 around the aperture 14 is an exteriorly threaded nipple 16 on which is screwed a cap 17 having a central guide aperture with which the outer end of the detent pin 13 is slidably engaged. Arranged on the pin 13 between the disk 15 and the inner side of the cap 17 is a light coiled spring 18 the pressure of which is exerted to yieldingly force the inner end of the pin inwardly and into engagement with the adjacent portion of the cranking shaft 6. In the shaft 6 opposite to the point engaged by the detent pin 13 is an annular beveled recess 19 one end of which terminates in a square stop shoulder 20 which when the cranking shaft 6 is forced outwardly by the spring 12 will come into engagement with the inner end of the detent pin 13 which is projected into the recess 19 by the spring 12 as will be readily understood. When the cranking shaft is forced inwardly and into operative engagement with the crank shaft the beveled surface of the recess 19 will engage the end of the detent pin and force the same outwardly against the pressure of its spring 18.

Loosely mounted on the extreme outer end of the cranking shaft 6 is a cranking wheel 21 comprising a smooth continuous rim 22 which is substantially circular in cross section to provide a proper hand grip and is formed integral with an unbroken smooth radially disposed web 23 in the center of which is formed the shaft engaging aperture 24 and in which is preferably formed a series of concentric segmental slots or openings 25 which are spaced a suitable distance from the aperture 24 and form short spokes 26. The unbroken web 23 which extends radially inward from the rim 22 forms a smooth riding surface for the fingers of the operator when he grips the rim 22 and permits his fingers to slip freely over said rim without danger of them becoming entangled with the spokes of the wheel should the engine back-fire and cause a reverse movement of the wheel as frequently happens and thus obviate any danger of injury from this action of the engine. The smooth continuous annular rim 22 circular in cross section also facilitates this slipping of the wheel through the hands of the operator without danger of injury.

On the inner side of the central portion of the web 23 is formed an annular concentric boss or flange 27 which is cut away or recessed in one side as at 27'. The flange or boss 27 corresponds in size or has the same diameter as the flange 10 on the gear 7 and to said flange or boss 27 is secured a wheel connecting member comprising a ring 28 which is preferably secured to the outer side of the boss or flange by a series of screws 29 and which has on its outer edge an inwardly extending annular flange 30 which fits around and engages the outer side of the flange 10 on the gear 7 as shown. By thus constructing the wheel 21 the same will be held in revoluble engagement with the outer end of the cranking shaft 6 by the engagement of the flange 30 of the ring 28 with the flange 10 on the gear 7.

In order to operatively connect the wheel 21 with the cranking shaft to turn the latter when the wheel is revolved in the proper direction, I provide a pawl 31 which is pivotally secured by a bearing screw 32 to the inner side of the web 23 of the wheel in the space or recess 28 in the boss or flange 27. When thus arranged the pawl 31 will be in position to engage the teeth of the ratchet gear 7 whereby when the wheel is turned in one direction the engagement of the pawl with said gear will turn the cranking shaft, which when connected with the cranking shaft of the engine will turn the latter. The pawl 31 is held in operative engagement with the teeth of the ratchet gear by a spring 33 and when the wheel 21 is turned in a reverse direction, the pawl will play loosely over the teeth of the ratchet gear so that the reverse movement of the wheel will not be imparted to the cranking shaft, thus preventing the engine shaft from being turned back or in a reverse direction. By providing the cranking wheel 21 with a perfectly smooth rim, there will be no projecting parts to strike and injure the operator should the engine back-fire when being started. Should the engine back-fire and impart a reverse movement to the cranking mechanism while the operator has hold of the cranking wheel the smooth rim of the latter will slide freely through the operator's hands and all danger of injury by this action will be obviated.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

In a cranking mechanism for engines the combination with the crank shaft thereof, of a revolubly mounted cranking shaft having a clutch connection with said crank shaft, a ratchet gear fixed on said cranking shaft, a radially projecting flange on said gear, a cranking wheel loosely mounted on said cranking shaft and comprising a web having on its outer edge a smooth unbroken rim adapted to be gripped by the operator, a concentrically arranged boss on one side of said web, a wheel retaining member comprising a ring secured to said boss and having on its outer edge a flange adapted to fit over and engage the flange on said gear whereby said wheel is revolubly held in position on the shaft, and a pawl carried by the wheel and adapted to be engaged with the teeth of said ratchet gear whereby the wheel is operatively connected with said cranking shaft when turned in one direction and will run loosely on the shaft when turned in the opposite direction.

In testimony whereof I have hereunto set my hand in presence of two subscribing witnesses.

WALTER H. WINKS.

Witnesses:
 STEPHEN W. LEITCH,
 CHAS. H. CORBETT.